March 15, 1949.  F. N. NIEDERKORN  2,464,648
DUST COLLECTOR

Filed Feb. 3, 1947  2 Sheets-Sheet 1

Inventor

Frank N. Niederkorn

By *Clarence A. O'Brien and Harvey B. Jacobson*
Attorneys

March 15, 1949.　　　F. N. NIEDERKORN　　　2,464,648
DUST COLLECTOR
Filed Feb. 3, 1947　　　　　　　　　　2 Sheets-Sheet 2
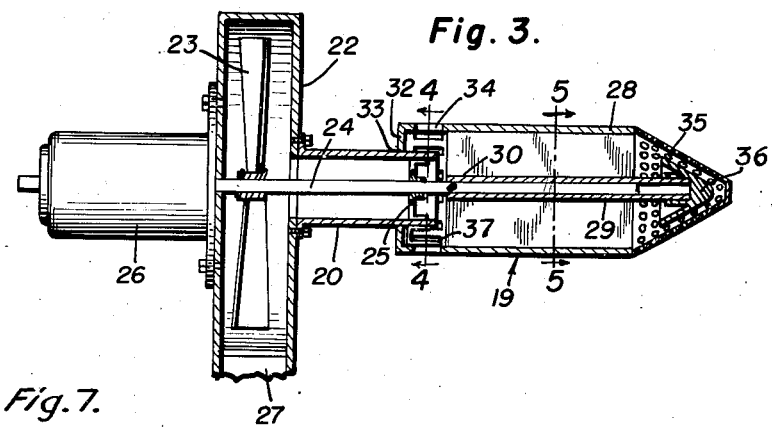
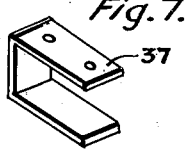
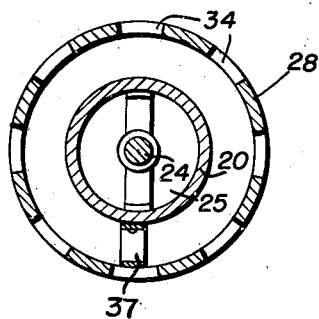
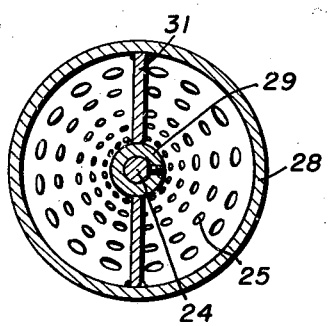
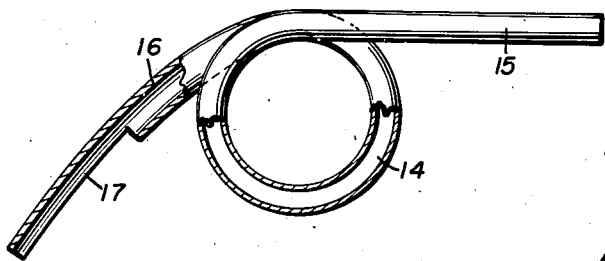
Inventor
Frank N. Niederkorn
By *Clarence A. O'Brien and Harvey B. Jacobson*
Attorneys Patented Mar. 15, 1949

2,464,648

UNITED STATES PATENT OFFICE 2,464,648

DUST COLLECTOR

Frank N. Niederkorn, Port Washington, Wis.

Application February 3, 1947, Serial No. 726,157

1 Claim. (Cl. 183—77)

The present invention relates to new and useful improvements in air purification and more particularly to means for collecting and removing dust from the air, the invention being designed particularly for use in industrial establishments where it is desired to purify dust laden air.

An important object of the present invention is to provide a device of this character including a container through which the dust laden air passes by suction means and to provide means for subjecting the dust laden air to centrifugal action whereby to separate the heavy particles from the air and deposit them in the container.

A further object of the invention is to provide means for emptying the dust collected in the container without interrupting the operation of the device.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged longitudinal sectional view of the outlet centrifugal separator.

Figure 1:
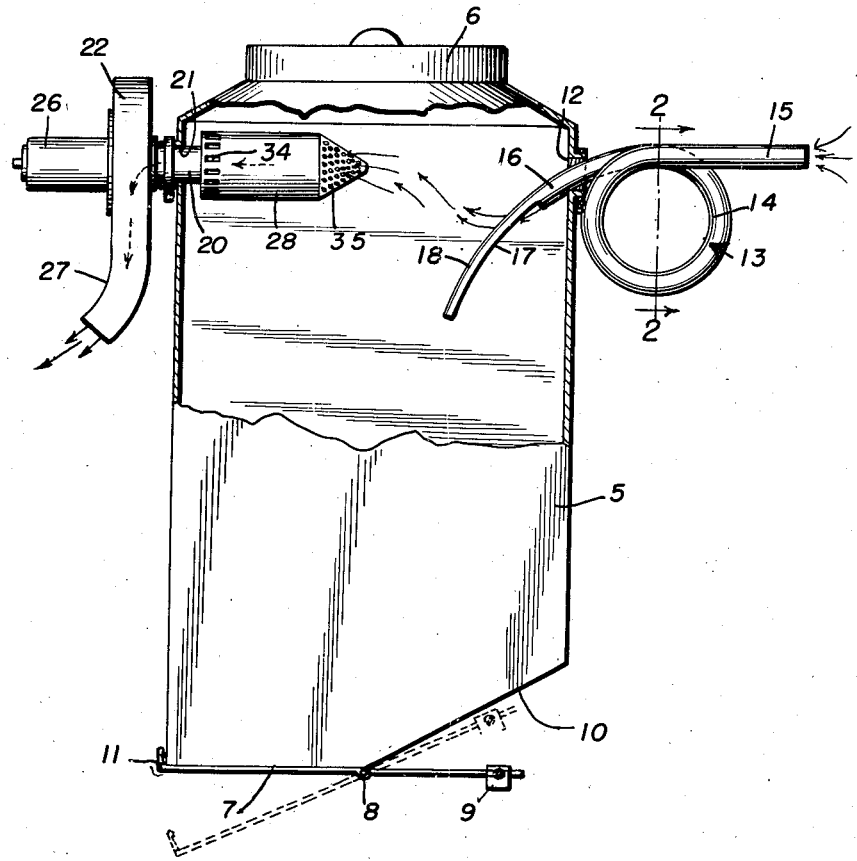
Figure 1 is a side elevational view with parts broken away and shown in section.
Figure 2:
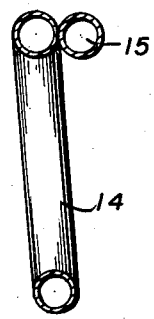
Figure 2 is an enlarged sectional view through the inlet centrifugal separator taken on a line 2—2 of Figure 1.

Figures 4 and 5 are transverse sectional views taken on the lines 4—4 and 5—5 of Figure 3.

Figure 6 is a side elevational view of the inlet centrifugal separator with parts broken away and shown in section; and Figure 7 is a perspective view of a scraper element in the outlet centrifugal separator.

Referring now to the drawings in detail, wherein for the purpose of illustration I have disclosed a preferred embodiment of the invention, the numeral 5 designates a container substantially cylindrical in form which is closed at its top by a cap or similar closure device 6 and provided at its bottom with an air-tight door 7 pivoted at its inner edge to the central portion of the bottom as shown at 8 and with the inner edge of the door provided with an arm 9 having a counterbalancing weight 9a adjustably secured thereto to urge the other end of the door upwardly into a closed position against the bottom of the container. The bottom of the container immediately above the arm 9 and counterbalancing weight 9a slopes upwardly as shown at 10 to permit upward swinging movement of the arm into the position shown by the dotted lines in Figure 1 to open the door by the weight of material collected in the bottom of the container to empty the same in a suitable receptacle (not shown).

The upper portion of the container 5, at one side thereof, is provided with an inlet opening at 12 in which the inner end of an inlet centrifugal separator designated generally at 13 is clamped in air-tight fitting engagement in the opening.

The separator 13 is constructed from a section of tubing and including a coil 14 at its intermediate portion positioned vertically and having an inlet end 15 extending horizontally outwardly from its upper portion and a discharge end 16 also at its upper portion which is curved inwardly and downwardly through the opening 12 of the container. The lower half of the discharge end 16 of the separator 13 is cut away as shown at 17 to provide a substantially semi-cylindrical deflector 18 at the upper half of the tube and which is curved inwardly and downwardly in the container as shown in Figure 1 of the drawings.

A second centrifugal separator designated generally at 19 includes a tube 20 which is clamped in an outlet opening 21 in the upper portion of the container 5 and at a side thereof diametrically opposite from the opening 12.

A fan housing 22 is secured to the outer end of the tube 20 and in which a suction fan 23 is mounted on a shaft 24 journalled in a bearing 25 in the tube 20. The shaft is operated by an electric motor 26 secured to the outer side of the housing 22 and one side of the fan housing is provided with an outlet 27.

A cylinder 28 is provided with a hub 29 which is suitably secured to the shaft 24 as indicated at 30, the cylinder being rigidly secured to the hub by radial webs 31.

The cylinder 28 is of a diameter greater than the tube 20 and the tube projects into the rear end of the cylinder in spaced relation from the walls thereof. The rear end of the cylinder is closed as shown at 32 and formed with a central opening 33 through which the tube 20 projects.

The walls of the cylinder 28 adjacent its rear end are formed with slots or openings 34 and to the front end of the cylinder is suitably secured a conical screen 35.

A conical deflector 36 is secured to the front end of shaft 24 within the screen 35 to deflect air entering the screen toward the walls of the cylinder. The heavier particles of dirt carried by the air are held to the walls of the cylinder by centrifugal action of the cylinder and by the rotary action of the webs 31.

In the operation of the device, the suction fan 23 is operated by the motor 26 to draw dust laden air into the container through the inlet separator 13 and out through the outlet separator 19. As the air enters the inlet end 15 of separator 13 and travels around vertical coil 14, the heavy particles or dust are forced toward the periphery of the coil by centrifugal action and as the dust passes through the outlet end 16 of the coil the dust continues downwardly under the shield 18 while the air partially freed of dust leaves the separator at the inner end of the shield at its underside. The dust is deposited in the container and the draft of air in the container caused by fan 23 draws the air to the separator 19 where the dust is further separated by centrifugal action of the cylinder 28 throwing the heavier particles outwardly against the walls of the cylinder as the air passes rearwardly therein, such particles then being discharged through the openings 34 back into the container. The lighter clean air passes centrally of the cylinder through the tube 20 and out through the outlet 27 of the fan housing.

A scraper 37 is secured to the tube 20 in the rear end of cylinder 28 and with one edge of the scraper against the walls of cylinder 28 to travel over the slots 34 to free dust clinging to the cylinder for passing through the slots into container 5.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the invention as claimed.

I claim:

In a dust collector comprising a container having an inlet and an outlet, a separator at the outlet comprising a tube extending to the atmosphere, a suction fan operatively connected to the outer end of the tube, a motor for the fan and including a shaft journalled in the tube and projecting into the container, radially disposed webs on an intermediate portion of said shaft; a cylinder connected to said webs to rotate with said webs and shaft and having one end enclosing the inner end of the tube, the other end of the cylinder being open, a deflector carried by the shaft at the open end of the cylinder to deflect air toward the walls thereof, discharge openings in the rear side walls of the cylinder, and a scraper fixed to said inner end of the tube and engaging the walls of the cylinder and registering with said discharge openings.

FRANK N. NIEDERKORN.

REFERENCES CITED

The following references are of record in the file of this patent:

UNITED STATES PATENTS

| Number | Name | Date |
|---|---|---|
| 451,543 | Watters | May 5, 1891 |
| 585,568 | Greiwe | June 29, 1897 |
| 1,628,099 | Arrowood | May 10, 1927 |
| 2,047,568 | Lissman | July 14, 1936 |
| 2,193,883 | Reeves | Mar. 10, 1940 |
| 2,228,129 | Stephano | Jan. 7, 1941 |
| 2,316,016 | Packie | Apr. 6, 1943 |

FOREIGN PATENTS

| Number | Country | Date |
|---|---|---|
| 627,213 | Germany | Mar. 11, 1936 |